United States Patent [19]

Percy

[11] Patent Number: 4,704,143
[45] Date of Patent: Nov. 3, 1987

[54] MULTISTAGE MICRONIC IN-LINE AFTER-AIR FILTER

[76] Inventor: Donald W. Percy, 100 Pillsbury Rd., South View Condo 9, Londonderry, N.H. 03053

[21] Appl. No.: 799,829

[22] Filed: Nov. 20, 1985

[51] Int. Cl.$^4$ .............................................. B01D 50/00
[52] U.S. Cl. ...................................... 55/274; 55/321; 55/481; 55/482; 55/487; 55/502; 55/463; 55/524; 55/350; 123/198 E
[58] Field of Search ................. 55/274, 321, 276, 463, 55/481, 482, 493, 494, 485–488, 502, 504, 505, 522, 350, DIG. 13, 524; 123/198 E

[56] References Cited

U.S. PATENT DOCUMENTS

| | | | |
|---|---|---|---|
| 24,551 | 6/1859 | Fontain | 55/503 |
| 991,572 | 5/1911 | Weisenstein | 55/485 |
| 2,087,688 | 7/1937 | Johnson | 55/503 |
| 2,966,960 | 1/1951 | Rochlin | 55/487 |
| 3,144,315 | 8/1964 | Hunn | 55/522 |
| 3,882,961 | 5/1975 | Cannon et al. | 55/276 |

FOREIGN PATENT DOCUMENTS

| | | | |
|---|---|---|---|
| 805427 | 8/1936 | France | 55/274 |
| 411877 | 5/1974 | U.S.S.R. | 55/502 |
| 1008480 | 11/1981 | U.S.S.R. | 55/463 |

Primary Examiner—Bernard Nozick
Attorney, Agent, or Firm—Ross, Ross & Flavin

[57] ABSTRACT

An in-line after-air filter is disclosed for optimal filtration of a maximum volume of air flowing to the engine. A multiple filter system comprising discrete abutting reticulated foam filter elements of different porosity impregnated with a petroleum-based agent trap air contaminants as the air flows from the primary filter to the engine manifold. An air expansion coupling, flared air inlet port and an air diffuser allow maximum air flow through the filter elements. A retainer plate having numerous six-sided openings allows a maximum volume of air to flow through the outlet port and the air funneler coupling to the engine manifold.

9 Claims, 7 Drawing Figures

MULTISTAGE MICRONIC IN-LINE AFTER-AIR FILTER

BRIEF SUMMARY OF THE INVENTION

This invention relates to a device which substantially reduces the amount of silica (ground up sand and abrasive minerals), cement dust and similar contaminants which heretofore passed through conventional engine air filters and air ducts to the engine intake manifold itself. The innovative engine after-air filter which is hereinafter described may be utilized in vehicle engines, plus off-road stationary and compressor equipment in order to dramatically reduce engine silica pass-through. Engine silica pass-through is widely recognized in the transportation and construction industries as a prime cause of engine wear. This multistage micronic in-line after-air filter system is installed between the existing conventional air filter system and the intake manifold or blower of a vehicle engine or compressor power plant. This invention substantially prevents the introduction of silica, cement dust, and the like into the engine, thus reducing engine wear in a wide range of transportation, marine, agriculture and construction equipment, air compressors and the like. In addition, an effective after-air filter should remove these contaminants while also allowing normal air flow through the filter into the engine. The present invention achieves these goals.

Conventional commercial air filtering systems are not configured to effectively filter silica and similar contaminants. Typical systems employ pleated paper filters in single or dual configurations. These systems fail to properly filter silica and associated contaminants, thereby allowing these substances to pass through to the power plant, thus reducing the life of the engine.

Because of the shortcomings described above, attempts have been made to remedy the situation by providing a secondary or after-air filter to adequately filter these contaminants before they reach the engine. An example of these attempts is set forth in U.S. Pat. No. 2,822,059 which describes an air filter having a series of vertically aligned abutting filter elements composed of fibers of metal, glass or synthetic resin. Each filter element is made from fibers of a diameter and thickness which varies from the remaining elements, progressing from relatively coarse to relatively fine particle filtration of the air entering the engine, for the stated purpose of delivering substantially dust free air to the engine.

Prior attempts, including the one described above, fail to achieve the objective of fully filtering the air while also allowing the largest possible amount or volume of filtered air to pass through the engine. The prior art contains no means for positively diffusing or expanding the airflow as it enters the filter system in order to maximize the amount of contaminants which come in contact with the filter surface over the entire area of said surface. Nor do prior systems contain a filter housing system which is designed to maximize the volume of unfiltered air by expanding or "flaring" between the mouth of the air inlet port and the beginning of the filter system. Also, no prior system disclosed air expansion and contraction couplings which allow an initial expansion of air flowing toward the filter flaring system from the primary air filter outlet hoses of smaller diameter, e.g. from a 6" outlet hose to a 7" air expansion coupling. Nor do prior systems disclose a series of filter elements composed of reticulated airfoam which are designed to trap a maximum number of contaminants on each of its honeycomb-like surfaces. Prior systems do not provide for full or partial oil-based impregnation of the filter elements in order to maximize contaminant deposition on each element so that the time between filter changes is lengthened significantly. Former devices also fail to include a positive means for determining when it is time to change the filters. Moreover, conventional systems fail to provide an air outlet system which includes a filter element retainer plate which is configured to permit the passage of a maximum amount of air from the final filter element to the engine.

The present invention rectifies the afore-mentioned shortcomings. Briefly, a multistage in-line micronic after-air filter is described, including a filter housing, with a series of filter elements releasably secured in the housing. Each of the filter elements is comprised of a reticulated airfoam "honeycomb" material comprising a three-dimensional network of interconnecting strands of a polyurethane resin. Each element abuts the next, is longitudinally aligned with the others, and each varies in porosity from most coarse to finest porosity in the direction of airflow through the filter. Each filter element may be varied in diameter and thickness and each is either fully or partially impregnated from back to front, (i.e., against the airflow direction) with a petroleum-based agent depending upon the intended use of the filter system. An air inlet port has positioned therein a movable air diffuser to deflect the airflow over the entire surface area of the filter system. The inlet port communicates with a "flared" portion inside the housing between the inlet port and the filter system in order to both expand the air flow and decrease its speed so that a maximum amount of contaminants can be fully filtered. A pair of air expansion and contraction couplings secured to the inlet and outlet ports, respectively, of the filter system allow the filter system to be positioned in the engine housing using a minimum amount of space which also initially expanding the airflow from the standard 6" air hose from the primary air filter to a 7" diameter maximized airflow just prior to said airflow reaching the air diffuser and the "flared" portion of the air inlet port. Similarly, after the air has been filtered, a second air coupling reduces the airflow hose diameter from 7" to 6" in order to couple the air filter system with the standard 6" hose configuration as the filtered air flows to the engine.

An innovative filter retainer plate mounted between the filter system and the air outlet port secures the filter against movement while the plate's hexagonal openings allow a maximum amount of filtered air to pass through its grill system. Also included is an air vacuum indicator gauge mounted to the housing on the outlet side to allow a user to know when it is time to change the filter elements without actually examining them. In addition, a "telltale" filter having more pores per inch ("PPI") than the remaining elements in the filter system is included as a second method for deciding when to change the filters. These features combine to provide optimal air filtration and maximum airflow to the engine.

DETAILED DESCRIPTION

Figure 1:
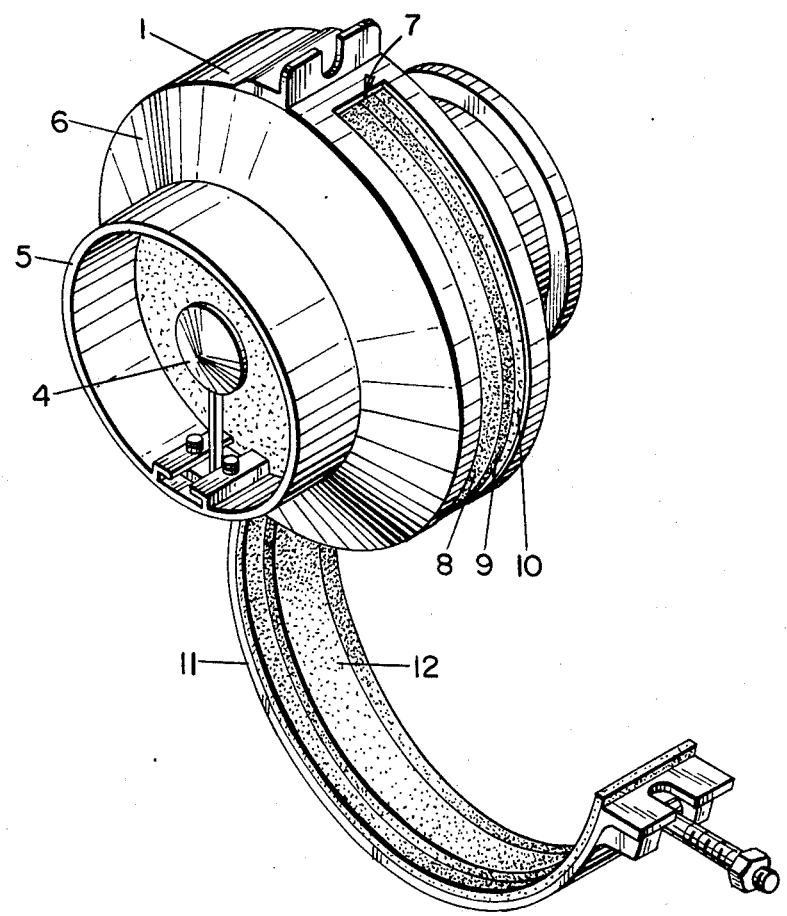
FIG. 1 is an elevated view of the inlet side of the filter, with the hinged filter cover opened to display the filter elements.
Figure 3:
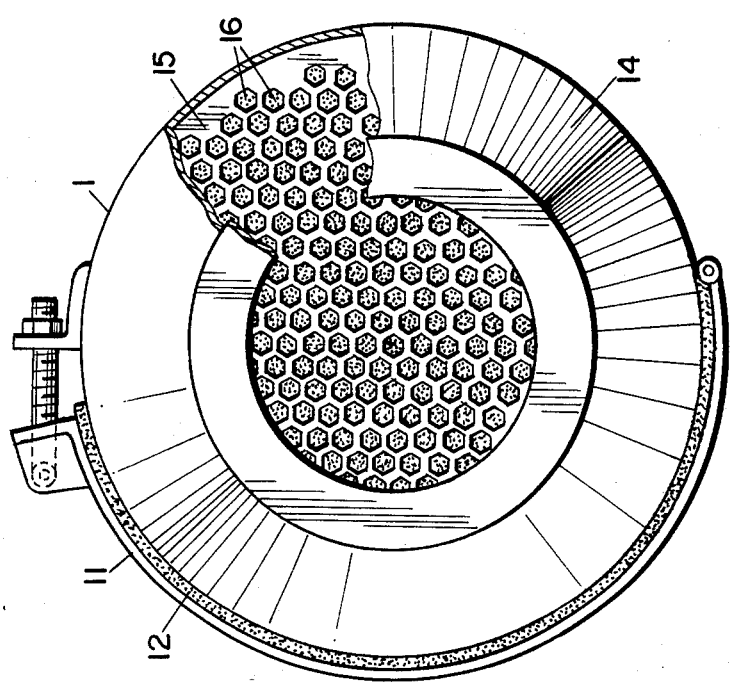
FIG. 3 is a head-on, partial cross-sectional view of the outlet side of the filter, showing the filter retainer plate and the filter cover in the closed position.

Referring to FIGS. 1, 2, 4 and 7 of the drawings, a multistage micronic in-line after-air filter 1 is situated between the existing conventional air filter (not shown) of a vehicle engine or blower (not shown) of a vehicle engine or compressor power plant. Air flowing from the primary filter through a conventional 6" air hose in a vehicle engine configuration is passed through air expansion coupling 2 which initially expands the airline diameter from 6" to 7", thereby initially expanding, and slowing, the flow of air to the filter system. In addition, the configuration of air expansion coupling 2 together with air contraction coupling 3 comprises an innovative method of initially expanding the air flow to the filter as well as utilizing available limited space under the engine hood to the fullest. This configuration also allows the use of filter elements varying in diameter from 10" to 14" because of the spacesaving design of couplings 2 and 3. Also, the concentric design of the couplings allows a maximum amount of air flowing through expansion coupling 2 to contact air diffuser 4 (FIGS. 1 and 2) when compared to an eccentric or off-center design. This configuration also allows air filter housing 1 to remain dimensionally within the plane of couplings 2 and 3 (see FIG. 7 at 5). This arrangement also reduces service intervals because of the increased diameter and surface area of the filter elements made possible by this structure. Couplings 2 and 3 are secured to filter housing 1 by serrated claps (not shown).

Air inlet 5 has positioned therein a movably mounted air diffuser 4. As air flows through air inlet 5, it is diffused or expanded as it contacts diffuser 4 in order to assist in achieving optimal uniform distribution of the air which is flowing toward the first element of the multistage filter system. Diffuser 4 is longitudinally movable in order to deflect air to all areas of the filter. Air inlet 5 is "flared" (see FIG. 4 at 6) in order to allow the airflow to both expand and slow down, thus increasing the volume of air as it approaches filter system 3 so that optimal filtration may be achieved by filter 7.

Figure 4:
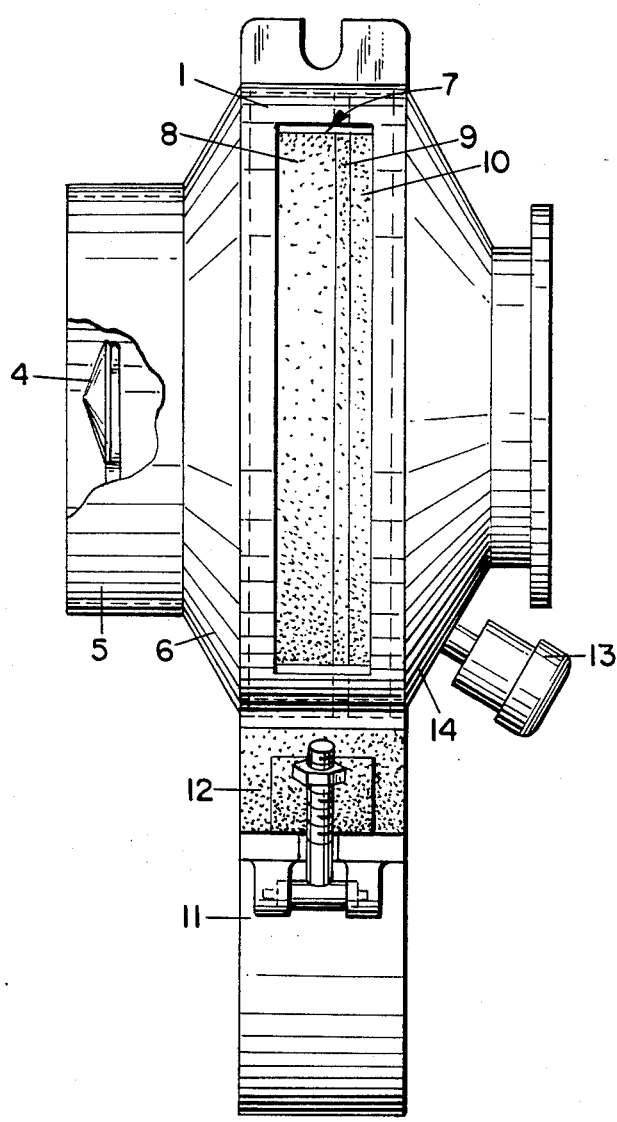
FIG. 4 is a side partial sectional view of the filter with the filter cover open.
Figure 5:
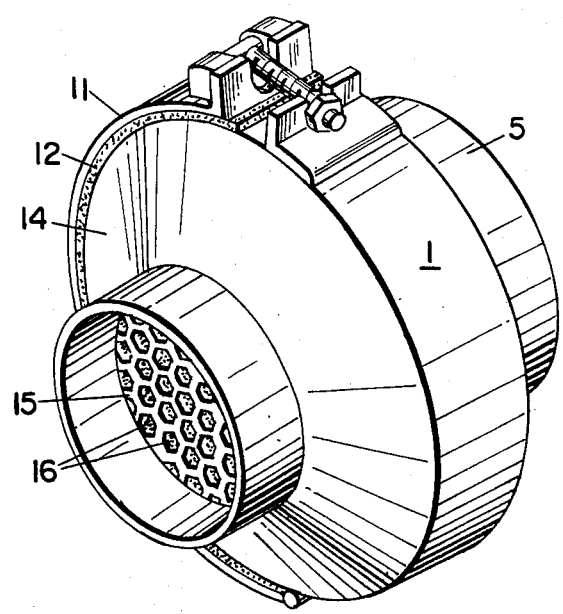
FIG. 5 is an elevated view of the outlet side of the filter.
Figure 6:
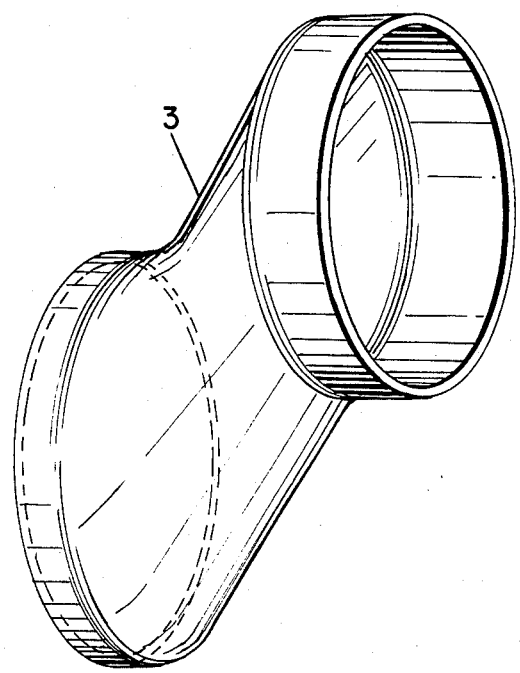
FIG. 6 is an elevated view of the air contraction coupling.
Figure 7:
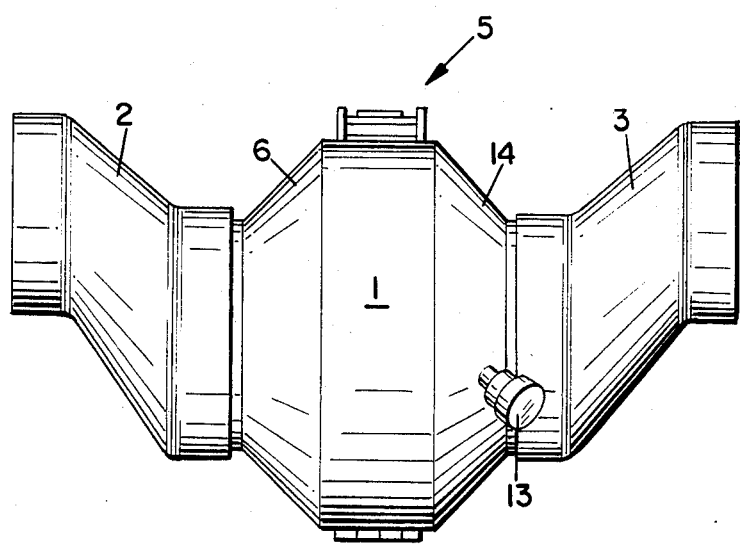
FIG. 7 is an elevated view of the filter housing and system, including the air expansion and contraction couplings.

Referring to FIGS. 1 and 4, a series of filter elements 8, 9 and 10 are each comprised of a reticulated airfoam "honeycomb" material consisting of a three-dimensional network of interconnecting strands of a polyurethane resin. Each element abuts its neighbor, is longitudinally aligned with the others, and each varies in porosity from the most coarse to the finest porosity in the direction of airflow through filter 7. Each filter element may be varied in diameter and thickness. Also, the number of elements may be varied. A typical configuration for a truck engine might consist of three elements, each 10" in diameter, having respective porosities of 30, 60 and 80 PPI (pores per inch), and respective thicknesses of $1\frac{3}{8}"$, $\frac{1}{4}"$, and $\frac{1}{4}"$. On the other hand a cement machine filter configuration might consist of filters $4\frac{1}{2}"$ thick and 24" in diameter. Depending on the particular application, each filter element is either fully or partially impregnated from back to front (i.e., against the airflow direction) with a petroleum-based agent such as Visi-lube. For example, a truck engine filter system may be impregnated on the "back" end only, while a cement machine filter may be fully impregnated. The impregnation helps the filter 7 to efficiently trap an optimal amount of contaminants as they flow toward the engine.

Figure 2:
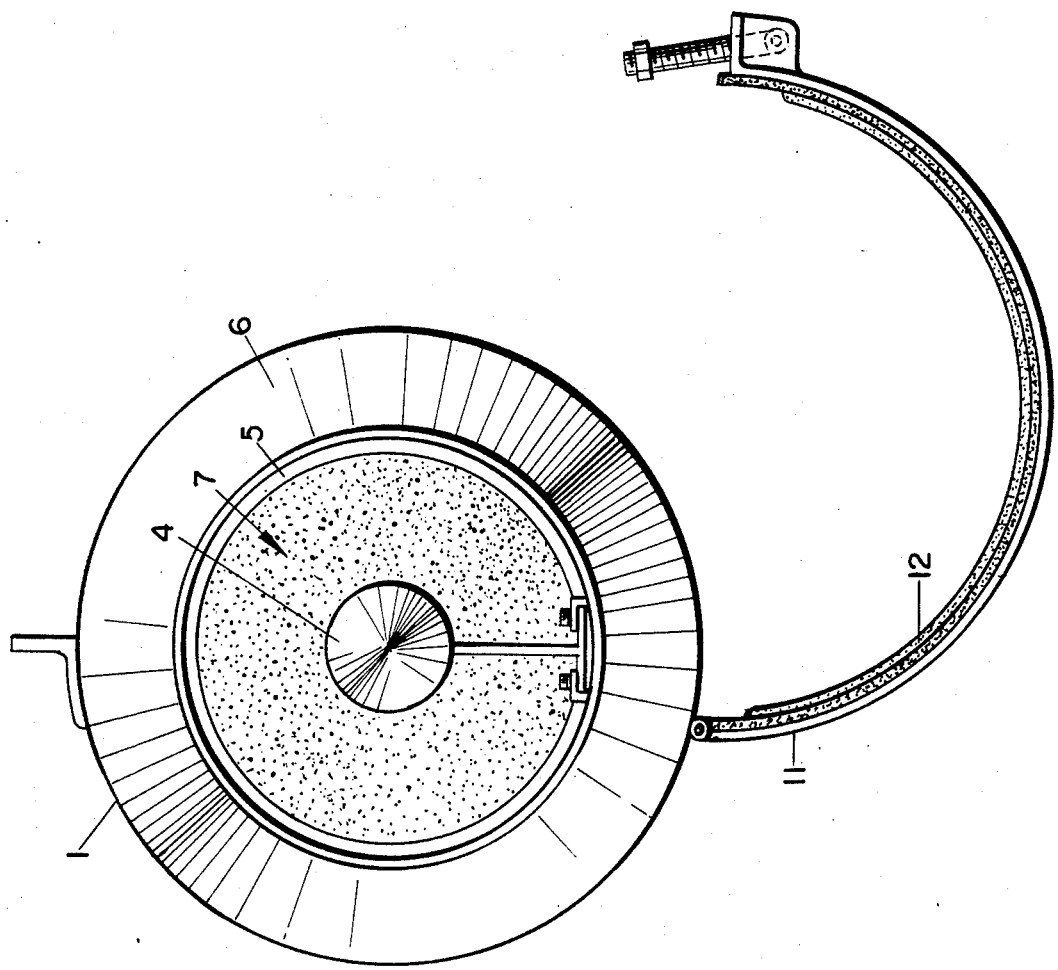
FIG. 2 is a head-on view of the inlet side of the filter, showing the air diffuser, the first filter element, and the filter cover in the open position.

Referring to FIGS. 1 and 2, filter elements 8, 9 and 10 are releasably mounted in housing 1 by hinged cover 11 which includes a compressible gasket 12, which when locked closely abuts the edges of the filter elements and prevents unfiltered air from passing around the filters. Air vacuum indicator gauge 13 (manometer) mounted to housing 1 on the outlet side thereof registers 1" to 25" of water vacuum and lets a filter user know when it is time to change the filter elements without actually examining them. In addition, filter element 10, a so-called "telltale" filter, has more PPI than elements 8 and 9, and thus acts as a second method for knowing when to change the filters.

Moving to the outlet side of the filter system, air outlet port 14 (FIG. 4) is narrowed or "funneled", as inlet port 6 is "flared", in order to perform the opposite function, i.e. to increase the velocity of the airflow as it moves toward the engine. Retainer plate 15 mounted between filter 10 and outlet port 14 secures elements 8, 9 and 10 against movement due to the force of the airflow. In addition, the configuration of openings 16, each of which is hexagonal or six-sided rather than round, maximizes the amount of filtered air which passes through the grill system of retainer plate 15. Testing has demonstrated that 52% of the filtered air passes through a round hole grid, while 82% of the filtered air flows through the innovative hexagonal grill of retainer plate 15. The present invention provides a multistage micronic in-line after-air filter system which achieves a primary objective of engine operation, namely, providing a maximum volume of optimally filtered air to the engine.

What is claimed is:

1. An in-line after-air filter mounted between an engine air filter and an engine air intake in fluid communication with the air hose thereof comprising: a filter housing, a flared air inlet port and a funneled outlet port; an air diffuser located in said inlet port to deflect air flowing through the inlet port in a uniform manner; a plurality of discrete, removable, contiguous air filter elements, each element comprising a three dimensional network of interconnecting strands of a polyurethane foam, each of said elements having at least its back or rear surface which is most removed from the airflow direction impregnated with a petroleum-based substance such that contaminants in the airflow tend to be first deposited on the rear surface of said elements in order to maximize the efficiency of said filter.

2. The filter of claim 1, in which each of said filter elements has a porosity which varies from the other elements, and said elements abut each other in decreasing porosity (PPI) from a relatively coarse to relatively fine element in the direction of airflow.

3. The air filter of claim 1, in which said air diffuser is movable in and against the airflow direction in order to direct and redirect inlet airflow across the surface area of the coarsest filter element in a uniform manner.

4. The air filter of claim 1, in which said air inlet and outlet ports are concentrically situated to one another.

5. The air filter of claim 1, in which said air inlet and outlet ports have mounted thereto an air expansion coupling and an air contraction coupling, respectively, in order to maximize the volume of air flowing to the engine while minimizing the space used under the engine hood.

6. The filter of claim 1, in which said air filter elements are secured by a retainer positioned between said filter and said outlet port, said retainer including a plurality of six-sided openings arranged in a pattern to maximize air flow from the filter to the outlet port.

7. The filter in claim 1, including a releasably hinged cover around said filter element compartment, which cover includes a compressible sealing element which when closed abuts said filter elements in order to prevent air contaminants from passing unfiltered around said filter.

8. The filter of claim 1, including an air vacuum indicator gauge mounted to said air filter housing on the outlet side to indicate when said filter elements require replacement without physically examining said elements.

9. The filter of claim 1, including a filter element having more pores per inch than the other elements in said filter, such that examination of the element enables one to readily ascertain the condition of the remaining filters for replacement purposes.

* * * * *